(12) United States Patent
Kim (10) Patent No.: US 12,434,541 B2
(45) Date of Patent: Oct. 7, 2025

(54) AIR VENT APPARATUS FOR VEHICLE

(71) Applicant: HYUNDAI MOBIS Co., Ltd., Seoul (KR)

(72) Inventor: Won Sik Kim, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 596 days.

(21) Appl. No.: 17/883,151

(22) Filed: Aug. 8, 2022

(65) Prior Publication Data

US 2023/0042840 A1 Feb. 9, 2023

(30) Foreign Application Priority Data

Aug. 9, 2021 (KR) .................. 10-2021-0104903

(51) Int. Cl.
*B60H 1/34* (2006.01)
*B60Q 3/20* (2017.01)
*B60Q 3/80* (2017.01)

(52) U.S. Cl.
CPC ............. *B60H 1/3421* (2013.01); *B60Q 3/20* (2017.02); *B60Q 3/80* (2017.02)

(58) Field of Classification Search
CPC ......... B60H 1/3421; B60H 2001/3471; B60H 2001/3492; B60Q 3/20; B60Q 3/80; B60Q 3/51; B60Q 3/88; B60Q 2500/20; B60R 16/033

USPC ....................................................... 454/155
See application file for complete search history.

(56) References Cited

U.S. PATENT DOCUMENTS

| | | | |
|---|---|---|---|
| 10,562,445 B2 | 2/2020 | Kramer | |
| 2019/0061613 A1* | 2/2019 | Krämer | ............. B60Q 3/14 |
| 2020/0259258 A1* | 8/2020 | Amiri | ............. H01Q 5/378 |
| 2022/0134840 A1* | 5/2022 | Evans | ......... B60H 1/00342 |
| | | | 62/117 |

* cited by examiner

*Primary Examiner* — Steven B Mcallister
*Assistant Examiner* — Charles R Brawner
(74) *Attorney, Agent, or Firm* — MORGAN, LEWIS & BOCKIUS LLP (57) ABSTRACT

An air vent apparatus for a vehicle according to one embodiment of the present disclosure includes a rear wing having a plurality of lead wires plated in a longitudinal direction by a laser manufacturing antenna (LMA) method, and a knob connected to the rear wing and configured such that a position of the knob is horizontally adjustable.

At this point, the knob includes a housing surrounding a partial section of the rear wing, an electrode portion located inside the housing and having input and output terminals electrically connected to the lead wire, and a light source electrically connected between the input and output terminals of the electrode portion to emit light into a vehicle.

9 Claims, 8 Drawing Sheets

AIR VENT APPARATUS FOR VEHICLE

CROSS-REFERENCE TO RELATED APPLICATION

This application claims priority to and the benefit of Korean Patent Application No. 10-2021-0104903, filed on Aug. 9, 2021, the disclosure of which is incorporated herein by reference in its entirety.

BACKGROUND

1. Field of the Disclosure

The present disclosure relates to an air vent apparatus for a vehicle.

2. Discussion of Related Art

In general, air vent apparatuses for a vehicle are operated by a method in which a user operates a knob to adjust a wind direction of a wing. However, such air vent apparatuses lead to many restrictions on a configuration of electrical connection lines (hereinafter, wires) for operating parts with small packaging.

For example, when wire paths of the operating parts are incorrectly considered in design, a problem such as a malfunction of the apparatus or an open circuit of the wire may occur.

As a specific example, when interior lightings are configured inside the knob as a part of providing convenience in a relatively narrow space according to a slim cockpit structure, conventional air vent apparatuses have difficulty in constituting a printed circuit board (PCB) inside the knob, and in the wiring process, there is a high possibility that the wires are exposed or interference between adjacent parts occurs.

As a result, it is difficult to implement various convenience structures within the slim type cockpit with the conventional wire method, thereby inevitably leading to disappointment in terms of diversity.

SUMMARY OF THE DISCLOSURE

The present disclosure is directed to providing an air vent apparatus for a vehicle, which may solve the conventional wire interference and open circuit problems through a wire integrated structure to which a laser manufacturing antenna (LMA) (hereinafter, referred to as an 'LMA') is applied.

The object of the present disclosure is not limited to the above-mentioned object, and other objects not mentioned herein will be clearly understood by those skilled in the art from the following description.

According to an aspect of the present disclosure, there is provided an air vent apparatus for a vehicle including a rear wing having a plurality of lead wires plated in a longitudinal direction by a laser manufacturing antenna (LMA) method, and a knob connected to the rear wing and configured such that a position of the knob is horizontally adjustable.

The knob includes a housing surrounding a partial section of the rear wing, an electrode portion located inside the housing and having input and output terminals electrically connected to the lead wire, and a light source electrically connected between the input and output terminals of the electrode portion to emit light into a vehicle.

A wiring engraved portion in which the lead wire is plated may be formed on a lower end surface of the rear wing in the longitudinal direction. The rear wing may include a knob connection portion providing a movement path of the knob in a partial section in the longitudinal direction.

The knob connection portion may have first and second recess portions formed by recessing on the movement path of the knob, and the first and second recess portions may be located at different heights.

The first and second recess portions may prevent the input and output terminals of the electrode portion connected to the plurality of lead wires from interfering with each other when the knob horizontally moves on the knob connection portion.

The lead wire may be electrically connected to a battery for a vehicle.

Meanwhile, an air vent apparatus for a vehicle according to a modified embodiment (different configuration) of the present disclosure includes a rear wing including a wiring engraved portion in which a plurality of lead wires connected to a battery for a vehicle are plated, and a knob connection portion having first and second recess portions having different heights in a partial section in a longitudinal direction, a knob electrically connected to the knob connection portion of the rear wing and configured such that a position of the knob is horizontally adjustable in the longitudinal direction of the knob connection portion, and a light source electrically connected between the lead wire of the rear wing and the knob to emit light into a vehicle.

The wiring engraved portion may be formed on a lower end surface of the rear wing in the longitudinal direction, and the first and second recess portions may be located at a central portion of the wiring engraved portion.

The lead wire may be plated inside the wiring engraved portion and on the first and second recess portions by a laser manufacturing antenna (LMA) method.

The knob may include a housing surrounding a partial section of the rear wing, and an electrode portion located inside the housing and having input and output terminals electrically connecting the light source and the lead wire.

According to the present disclosure, an air vent apparatus for a vehicle can solve the conventional wire interference and open circuit problems through a wire integrated structure to which a laser manufacturing antenna (LMA) (hereinafter, referred to as an 'LMA') is applied.

In particular, the present disclosure is significant in that the wire can be configured even in a narrow space to present the modeling capable of reflecting various design structures, and at the same time, provide various convenience structures.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present disclosure and methods of achieving them will be made clear from embodiments described in detail below with reference to the accompanying drawings. However, the present disclosure is not limited to embodiments disclosed below but will be implemented in various different forms, and only these embodiments are provided so that the disclosure of the present disclosure will be thorough and complete and will fully convey the scope of the present disclosure to those skilled in the art to which the present disclosure pertains, and the present disclosure is defined by the description of the claims. Meanwhile, terms used herein are for the purpose of describing the embodiments and are not intended to limit the present disclosure. In the present specification, the singular forms include the plural forms as well unless the context clearly indicates otherwise. The terms "comprise" or "comprising" used herein do not preclude the presence or addition of one or more other elements, steps, operations, and/or devices other than stated elements, steps, operations, and/or devices. As used in the present specification, the term "and/or" includes any one of the corresponding listed items and all combinations of one or more of them.

Hereinafter, embodiments of the present disclosure will be described in detail with reference to the accompanying drawings.

First Embodiment (Basic Embodiment)

FIGS. 1 to 5 show an air vent apparatus for a vehicle according to a first embodiment of the present disclosure.

Referring to FIGS. 1 to 5, an air vent apparatus for a vehicle 10 is mounted inside a dashboard (not shown) inside a vehicle to convert air introduced from an air-conditioner (not shown) for a vehicle into a direct wind mode or an indirect wind mode and guide the air into the vehicle. The air vent apparatus for a vehicle 10 adopts a convenience structure such as lighting so that a user easily identifies the air vent apparatus in a process of performing each function.

To this end, the air vent apparatus for a vehicle 10 includes a duct 100, a front wing 200, a rear wing 300, a knob 400, and a guide bracket 500.

The duct 100 has an air flow path provided with an inlet and an outlet as a portion communicating with an air-conditioner. The inlet is a portion connected to the air-conditioner, and the outlet is a portion directed to the interior of the vehicle.

The front wing 200 is located on the air flow path of the duct 100 to adjust the flow of air directed to the interior of the vehicle in a left-right direction (horizontally).

The rear wing 300 is located at the outlet of the duct 100 to adjust the flow of air directed to the interior of the vehicle in an up-down direction (vertically).

The rear wing 300 includes a wiring engraved portion 310 and a knob connection portion 340.

The wiring engraved portion 310 is formed on a lower end surface of the rear wing 300 in a longitudinal direction.

First and second lead wires 320 and 330 electrically connected to a battery for a vehicle are plated inside the wiring engraved portion 310 by a laser manufacturing antenna (LMA) method. The first and second lead wires 320 and 330 may be applied within the rear wing 300, which is an injection assembling part, in an integrated structure.

As another example, the first and second lead wires 320 and 330 electrically connected to the battery for a vehicle may be configured by a conductive ink inside the wiring engraved portion 310.

The knob connection portion 340 is located in a partial section in the longitudinal direction of the rear wing 300 and provides a movement path of the knob 400.

Such a knob connection portion 340 includes a first recess portion 341 and a second recess portion 342 having different heights. Here, the first recess portion 341 and the second recess portion 342 may be located at a central portion of the wiring engraved portion 310.

The first and second lead wires 320 and 330 plated on the wiring engraved portion 310 may be plated in the first recess portion 341 and the second recess portion 342.

The knob 400 serves to horizontally rotate and adjust the front wing 200 by a user's manual operation and/or an automatic operation in conjunction with the front wing 200 and the rear wing 300, and vertically rotate and adjust the rear wing 300.

Such a knob 400 includes a housing 410, an electrode portion 420, a light source 430, and a cover 440.

The housing 410 may have a E shape surrounding a partial section of the rear wing 300, and have an end with an opened one surface snap-fit fastened vertically. At this point, the end of the housing 410 with the opened one surface is connected to the front wing 200. In other words, the housing 410 may be connected to the front wing 200 in a state of surrounding the rear wing 300 to adjust wind directions of the front wing 200 and the rear wing 300 by the up, down, left, and right operations.

The electrode portion 420 includes a first terminal 421 and a second terminal 422 located inside the housing 410 and electrically connected to the first and second lead wires 320 and 330.

Here, the first terminal 421 and the second terminal 422 may be configured as an input terminal and an output terminal, respectively. For example, when the first terminal 421 is the input terminal, the second terminal 422 may be the output terminal, and when the first terminal 421 is the output terminal, the second terminal 422 may be the input terminal.

The light source 430 is electrically connected between the first and second terminals 421 and 422 of the electrode portion 420 to emit light into a vehicle.

The cover 440 may be snap-fit fastened to the other end of the opened one surface of the housing 410 in the form of surrounding the light source 430. At this point, the cover 440 may be also made of a transparent or opaque material or formed in a mesh shape to generate the lighting of the light source 430.

Meanwhile, as a specific example in which the light source 430 is connected to emit light, when the first terminal 421 is the input terminal, one end of the first terminal 421 is electrically connected to the light source 430, and the other end of the first terminal 421 is electrically connected to the first lead wire 320.

One end of the second terminal 422 is electrically connected to the light source 430, and the other end of the second terminal 422 is electrically connected to the second lead wire 330.

One ends of the first and second lead wires 320 and 330 may be connected to the first terminal 421 and the second terminal 422, respectively, and the other ends of the first and second lead wires 320 and 330 may be connected to a battery. The battery may supply power to the light source 430 with the flow of a current through an anode and a cathode.

At this point, the battery may be managed by a battery management unit (BMU), and the BMU may be controlled by an electronic control unit (ECU).

The first and second recess portions 341 and 342 are configured in a stepped structure. This is to prevent the first and second terminals 421 and 422 of the electrode portion 420 to which the first and second lead wires 320 and 330 are connected from interfering with each other when the knob 400 horizontally moves on the knob connection portion 340.

The guide bracket 500 is connected to both ends of the rear wing 300 within the duct 100 to guide the vertical adjustment of the rear wing 300. Both ends of such a guide bracket 500 are provided with first and second connectors 510 and 520 connected to the first and second lead wires 320 and 330, respectively. Here, the first and second connectors 510 and 520 serve as a connection medium connecting between the first and second lead wires 320 and 330 and the battery.

A shaft groove connected to rotation shafts 350 formed at both ends of the rear wing 300 is provided at a rear end of the guide bracket 500, and a guide hole 530 to which a guide shaft 360 of the rear wing 300 is fastened to guide a rotation path of the guide shaft 360 is formed at a front end of the guide bracket 500. At this point, the guide hole 530 may be formed at one and/or all of two guide brackets 500 connected to both ends of the rear wing 300, and the number of guide hole 530 may be the same as the number of guide shafts 360.

Second Embodiment (Modified Embodiment)

Figure 1:
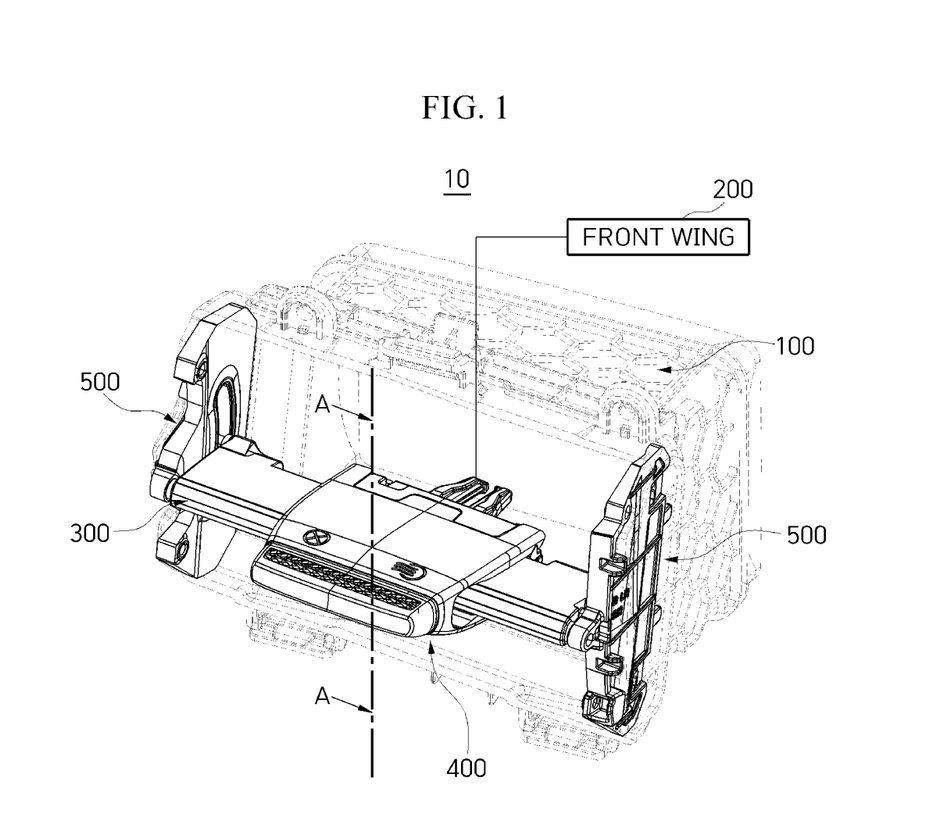
FIG. 1 is a partial perspective view schematically showing an air vent apparatus for a vehicle according to a first embodiment of the present disclosure.
Figure 2:
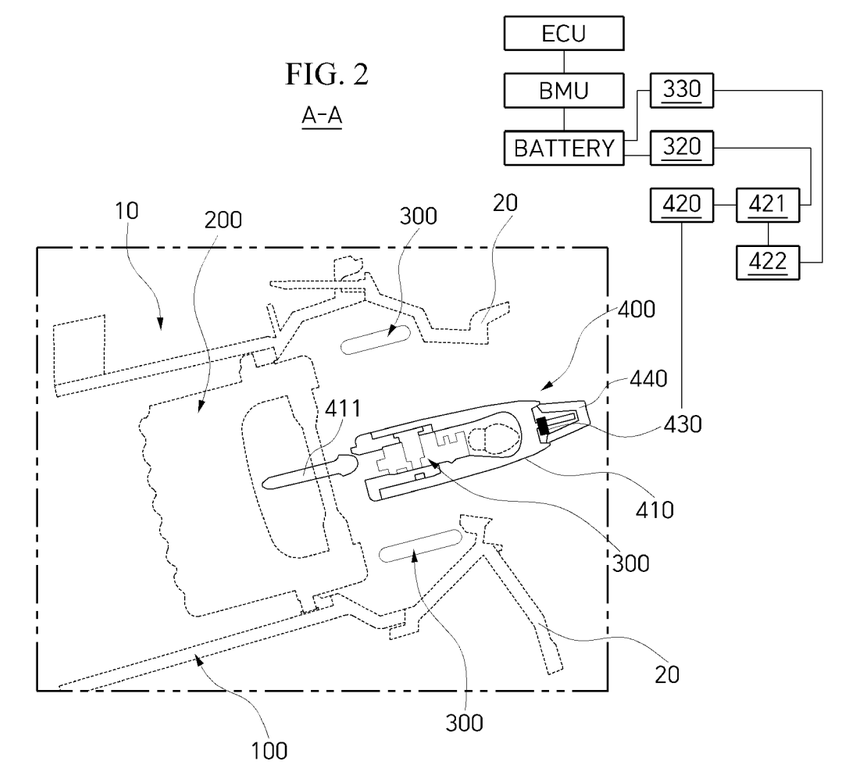
FIG. 2 is a cross-sectional view taken along line A-A indicated in FIG. 1.
Figure 3:
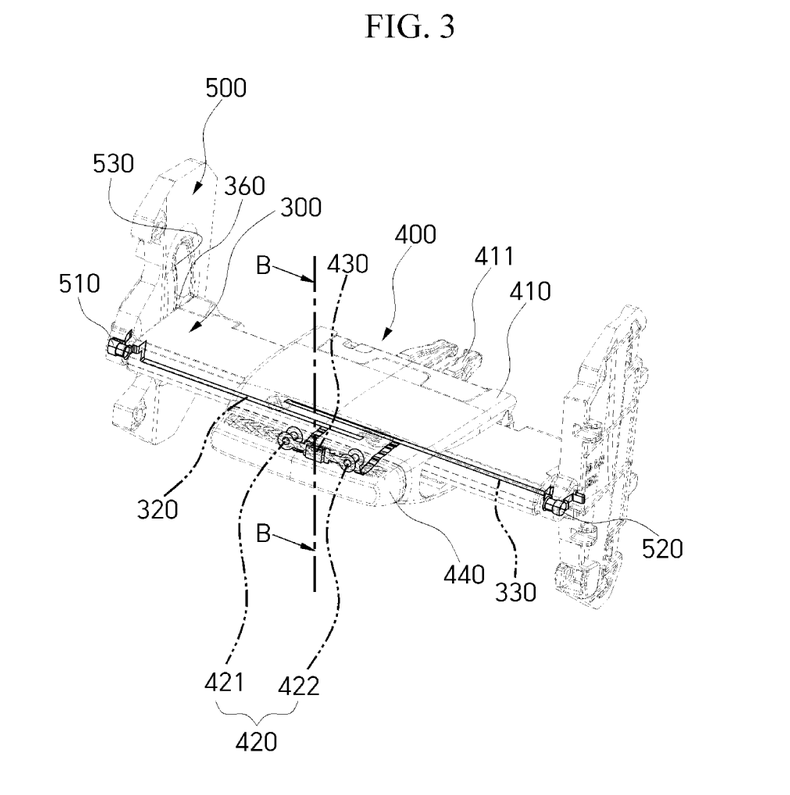
FIG. 3 is an exemplary view showing a connection relationship between a lead wire plated by an LMA method and a light source in the air vent apparatus for a vehicle according to the first embodiment of the present disclosure.
Figure 4:
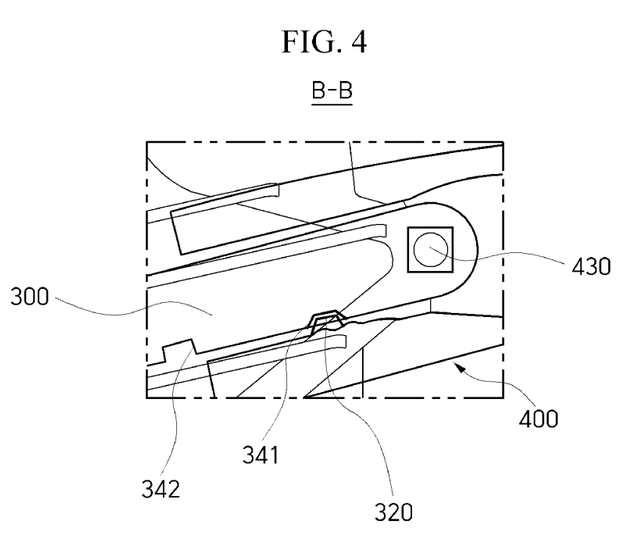
FIG. 4 is a cross-sectional view taken along line B-B indicated in FIG. 3.
Figure 5:
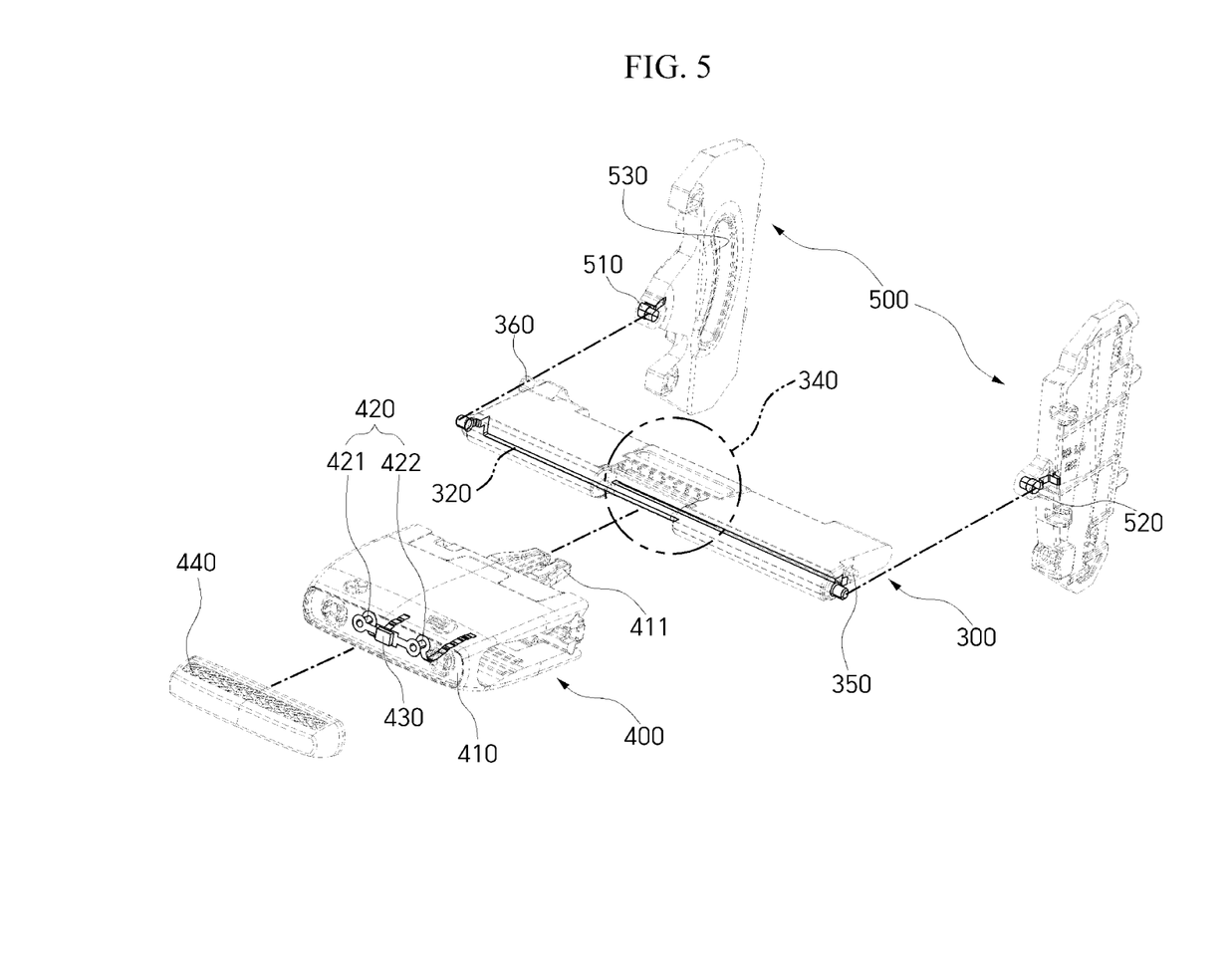
FIG. 5 is a configuration exploded view showing the connection between the lead wire plated by the LMA method and the light source in the air vent apparatus for a vehicle according to the first embodiment of the present disclosure.
Figure 6:
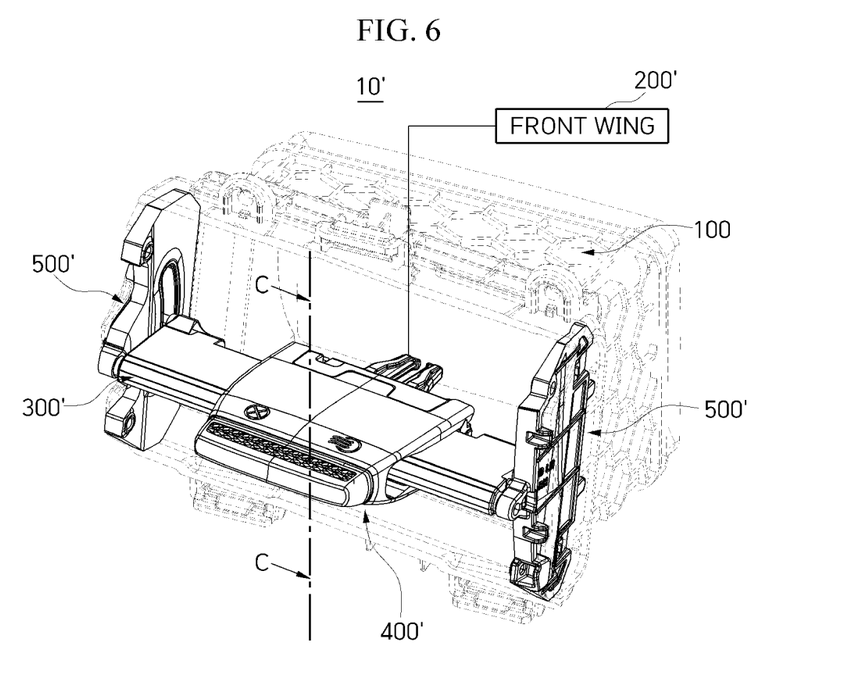
FIG. 6 is a partial perspective view schematically showing an air vent apparatus for a vehicle according to a second embodiment of the present disclosure.
Figure 7:
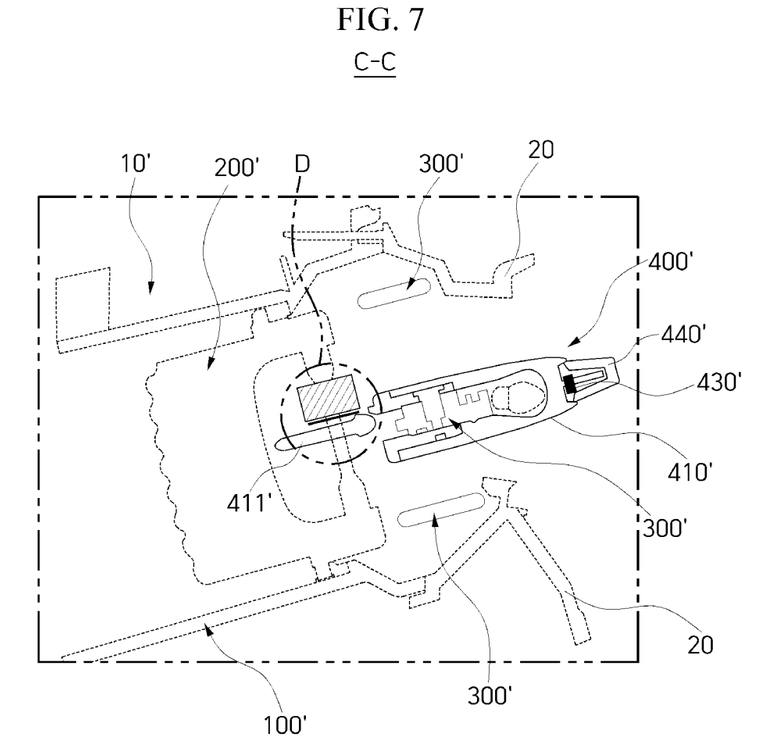
FIG. 7 is a cross-sectional view taken along line C-C indicated in FIG. 6.
Figure 8A:
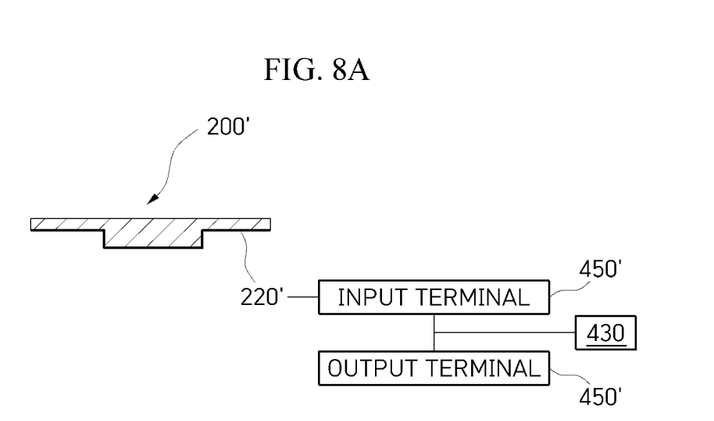
FIGS. 8A to 8B are a partial front views of part D indicated in FIG. 7.
Figure 8B:
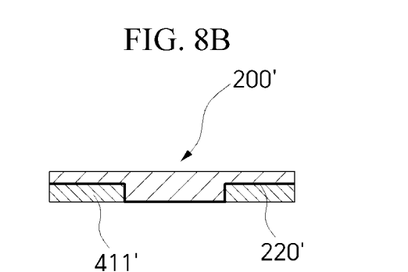

FIGS. 6 to 8 show an air vent apparatus for a vehicle according to a second embodiment of the present disclosure.

Referring to FIGS. 6 to 8, unlike the first embodiment, in an air vent apparatus 10' according to the second embodiment, a lead wire 220' may be plated on a plated portion 210' of a front wing 200' in the LMA method, or the lead wire 220' may be constituted using a conductive ink.

As the lead wire 220' is concealed by the plated portion 210' of the front wing 200', the lead wire 220' is not exposed to the outside, and the lead wires 220' do not interfere with each other even when each component is operated and fastened, so that it is possible to solve malfunction or wire open circuit problems of the apparatus.

The plated portion 210' may be formed to be curved along a lower end of the front wing 200', and the lead wire 220' may be plated corresponding to a shape of the plated portion 210'.

Here, a plurality of lead wires 220' may be disposed to be spaced apart from each other, and input and output terminals 450' and 460' each connected to the plurality of lead wires 220' are built by a knob 400'. A light source 430' is electrically connected between the input and output terminals 450' and 460'.

The above-described first and second embodiments exemplify each configuration, but the first and second embodiments may be integrally applied in some cases. For example, the plating the lead wire in the LMA method may also constitute the rear wing 300 in the first embodiment and the front wing 200' in the second embodiment as one embodiment.

Accordingly, the present disclosure is not limited to the above-described embodiments, and may be variously modified and practiced without departing from the technical spirit of the present disclosure.

What is claimed is:

1. An air vent apparatus for a vehicle, the air vent apparatus comprising:
   a rear wing having a plurality of lead wires plated in a longitudinal direction of the rear wing by a laser manufacturing antenna (LMA) method; and
   a knob connected to the rear wing and configured such that a position of the knob is horizontally adjustable, wherein the knob includes:
   a housing surrounding a partial section of the rear wing;
   an electrode portion located inside the housing, and having input and output terminals electrically connected to the lead wire; and
   a light source electrically connected between the input and output terminals of the electrode portion to emit light into the vehicle, wherein a wiring engraved portion in which the lead wire is plated on a lower end surface of the rear wing in the longitudinal direction.

2. The air vent apparatus of claim 1, wherein the rear wing includes a knob connection portion configured to provide a movement path of the knob in a partial section in the longitudinal direction.

3. The air vent apparatus of claim 2, wherein the knob connection portion has first and second recess portions formed on the movement path of the knob, and
   the first and second recess portions are located at different heights.

4. The air vent apparatus of claim 3, wherein the first and second recess portions are configured to prevent the input and output terminals of the electrode portion connected to the plurality of lead wires from interfering with each other when the knob horizontally moves on the knob connection portion.

5. The air vent apparatus of claim 1, wherein the lead wire is electrically connected to a battery of the vehicle.

6. An air vent apparatus for a vehicle, the air vent apparatus comprising:
   a rear wing including a wiring engraved portion in which a plurality of lead wires connected to a battery for the vehicle are plated, and a knob connection portion having first and second recess portions at different heights in a partial section in a longitudinal direction of the knob connection portion;
   a knob electrically connected to the knob connection portion of the rear wing and configured such that a position of the knob is horizontally adjustable in the longitudinal direction; and
   a light source electrically connected between the lead wire of the rear wing and the knob to emit light into the vehicle.

7. The air vent apparatus of claim 6, wherein the wiring engraved portion is formed on a lower end surface of the rear wing in the longitudinal direction, and the first and second recess portions are located at a central portion of the wiring engraved portion.

8. The air vent apparatus of claim 7, wherein the lead wire is plated inside the wiring engraved portion and plated on the first and second recess portions by a laser manufacturing antenna (LMA) method.

9. The air vent apparatus of claim 6, wherein the knob includes:
 a housing surrounding a partial section of the rear wing; and
 an electrode portion located inside the housing and having input and output terminals electrically connecting the light source and the lead wire.

\* \* \* \* \*